Patented May 2, 1933

1,906,873

UNITED STATES PATENT OFFICE

FREDUS N. PETERS, JR., OF EVANSTON, ILLINOIS, ASSIGNOR TO QUAKER OATS COMPANY, OF CHICAGO, ILLINOIS, A CORPORATION OF NEW JERSEY

METHOD FOR THE REDUCTION OF FURFURAL AND FURAN DERIVATIVES

No Drawing. Application filed April 26, 1928, Serial No. 273,164. Renewed June 27, 1932.

My invention relates to an improved method for the reduction of furfural and furan derivatives for the production of commercially useful products.

This application is a continuation in part of my copending application Serial Number 171,725, filed February 28, 1927 and entitled "Method for the reduction of furfural and furan derivatives".

Heretofore the reduction of furan derivatives and especially furfural has been practiced only on a laboratory or experimental scale. One laboratory method utilizes the action of hydrogen at pressure slightly above atmospheric on liquid furfural and other furan derivatives in the presence of a noble metal catalyst such as platinum. Another laboratory method utilizes furfural in the vapor phase mixed with hydrogen passed over an iron or nickel catalyst maintained at temperatures ranging between 190° to 200° C. The first method gives relatively high yields of reduction products but is extremely expensive because of the high cost of the catalyst. The second method is inefficient because of the low yields of reduction products and the uncontrollable nature of the process which results in the production of a heterogeneous mixture of compounds whose nature or per cent cannot be predetermined.

I have discovered that the reduction of furfural and other furan derivatives can be easily and economically effected by hydrogenation under pressure at an elevated temperature in the presence of a base metal catalyst. By my improved process, the products of hydrogenation are obtained in high yields and the reduction can be so controlled that the production of undesirable products can be minimized or substantially eliminated.

The following examples are illustrative of the process of my present invention:

Example 1

An aqueous solution of 200 parts of nickel nitrate hexahydrate, $(Ni(NO_3)_2.6H_2O)$ and 80 parts of magnesium nitrate hexahydrate, $(Mg(NO_3)_2.6H_2O)$ is heated to boiling and to it is added, preferably with constant stirring, a hot aqueous solution of 80 parts of sodium hydroxide (NaOH). The precipitated hydroxides thus obtained are then filtered, washed free from nitrates and sodium compounds, dried and reduced in a stream of hydrogen for 6 to 12 hours at a temperature of 290°–330° C.

This catalyst comprising metallic nickel and magnesium oxide is then added to furfural in the proportions of 60 parts by weight to 900 parts by weight of furfural and the mixture introduced into an autoclave having an agitating device. Hydrogen is then admitted into the autoclave and maintained therein under a pressure of approximately 200 lbs., while the temperature is raised to between 90° C. and 170° C., the mixture being stirred vigorously during the process which is continued until absorption of hydrogen practically ceases.

By following the above described process high yields (90%–95% theoretical) of furfuryl alcohol are obtained.

Example 2

An aqueous solution of 747 parts of magnesium nitrate hexahydrate $(Mg(NO_3)_2.6H_2O)$ and 581.6 parts of nickel nitrate hexahydrate $(Ni(NO_3)_2.6H_2O)$ is heated to boiling and to it is added, with constant stirring, a hot aqueous solution of 393 parts of sodium hydroxide. The precipitated hydroxides are filtered, washed free from nitrates and sodium compounds, dried and reduced in a stream of hydrogen for approximately 10 hours at a temperature of approximately 320° C.

This catalyst comprising metallic nickel and magnesium oxide is then added to furfural to which has been added a solvent comprising, for example, tetrahydrofurfuryl alcohol and small amounts of n-amyl alcohol, the amount of catalyst being from 2% to 5% of the weight of the furfural. The mixture is introduced into an autoclave having an agitating device, and hydrogen is admitted until a pressure of from 700 lbs. to 1900 lbs. is reached. The temperature is maintained at 100° C.–140° C. and the mixture stirred vigorously for a period of approximately 7 hours or until absorption of hydrogen practically ceases.

Under these conditions a final product is obtained which is free from unsaturated compounds and which contains for the most part tetrahydrofurfuryl alcohol.

Example 3

The catalyst is prepared in a manner similar to that given in Example 2 with the exception that the magnesium nitrate hexahydrate and nickel nitrate hexahydrate are added in an amount sufficient to produce magnesium oxide in the proportions of approximately 5 parts magnesium oxide to 50 parts of metallic nickel in the reduced catalyst. This catalyst comprising metallic nickel and magnesium oxide in the proportion of 50 parts of metallic nickel to 5 parts of magnesium oxide is then added to furfural in the proportion of from 2 to 5 per cent of the weight of the furfural. The mixture is introduced into an autoclave having an agitating device and hydrogen is then added until a pressure of from 700 to 1900 pounds is reached. The temperature is maintained at approximately 100 to 200° C. and the mixture stirred vigorously for a period of approximately 4 to 5 hours or until the absorption of hydrogen practically ceases. It is to be noted that in this example no solvent has been added to the furfural although the addition of solvent does not affect the course of the reaction. Under these conditions, a final product is obtained which is substantially free from unsaturated compounds and which contains for the most part tetrahydrofurfuryl alcohol.

While in the foregoing example the mixture of furfural and the catalyst has been treated for a period of approximately 4 to 5 hours in order to secure for the most part tetrahydrofurfuryl alcohol, I have ascertained that in the reduction the furfural is reduced substantially completely to furfuryl alcohol before any substantial amount of tetrahydrofurfuryl alcohol is formed. As a consequence I have been able by this method to procure a product consisting substantially entirely of furfuryl alcohol by controlling or arresting the reaction at such a point that the quantity of hydrogen absorbed is sufficient merely to reduce the furfural to furfuryl alcohol.

It is to be understood, therefore, that my invention contemplates the treatment of furfural to procure furfuryl alcohol as well as to procure tetrahydrofurfuryl alcohol, the treatment in the first instance being controlled or arrested at a definite stage while in the second instance the treatment is prolonged to secure complete reduction.

Example 4

To make the catalyst, 118.7 parts of nickel carbonate are thoroughly mixed with 58.7 parts of kieselguhr. The mixture is then reduced in a stream of hydrogen for approximately 3 hours at a temperature of approximately 360° C. and cooled in an atmosphere of carbon dioxide or nitrogen or other inert gas.

This catalyst is then added to furfural, to which has been added 0.5 to 3 per cent of an alkaline agent such as sodium carbonate, sodium hydroxide, magnesium oxide or urea, in the proportion of 2 to 5 parts by weight of the catalyst to 100 parts by weight of furfural. The mixture is then introduced into an autoclave having an agitating device. Hydrogen is admitted until a pressure of 700 to 2000 lbs. is obtained while the temperature is maintained at 100 to 200° C. for a period of several hours, or until the absorption of hydrogen practically ceases, the mixture being stirred vigorously during the process. Under these conditions a final product is obtained which contains for the most part tetrahydrofurfuryl alcohol.

While the foregoing example contemplates that the period of treatment has been prolonged sufficiently to procure tetrahydrofurfuryl alcohol, it is to be noted that the reaction may be controlled or arrested at the proper stage in order to secure furfuryl alcohol as the end product.

Example 5

The catalyst is prepared as described in Example 4.

This catalyst is then added to furfural, with or without the addition of a solvent, in the proportions of 25 parts by weight of the catalyst to 576 parts by weight of the furfural. The mixture is introduced into an autoclave having an agitating device. Hydrogen is admitted and maintained at a pressure of 1000 lbs. to 1800 lbs., while the temperature is maintained at 90° C.–140° C. for a period of two hours, the mixture being stirred vigorously during the process.

Under these conditions a final product is obtained which contains a substantial amount of methyl furan.

Example 6

The catalyst may be prepared by precipitating nickel carbonate from an aqueous solution of nickel sulfate by the addition of soda ash ($Na_2CO_3H_2O$). The nickel carbonate is then washed thoroughly to remove the soluble salts such as sodium sulfate. During the last washing the nickel carbonate is thoroughly intermixed with an inert material such as kieselguhr or other siliceous material, in such proportion that the weight of inert material is equal to the weight of the metallic nickel in the reduced catalyst. The mixture is then filtered and dried, after which it is carefully calcined to convert the nickel carbonate to nickel oxide. The mixture is then reduced in a stream of hydrogen at a temperature of approximately 300 to 400° C. for a period of 3 to 7 hours.

The catalyst is added to a solution of a furan derivative in a non-reducible solvent, such as methyl alcohol, ethyl alcohol, isopropyl alcohol or water, or mixtures of two or more of these solvents, in the proportions of approximately 2 to 5 parts by weight of catalyst to 100 parts by weight of the furan derivative.

Solutions which have been reduced efficiently by the process of the invention include the following:—furoic acid in ethyl alcohol; sodium furoate in a mixture of water, ethyl alcohol and isopropyl alcohol; furacrylic acid in isopropyl alcohol and ethyl alcohol; sodium furacrylate in water and isopropyl alcohol; furfural acetone in ethyl alcohol; ethyl furoate in ethyl alcohol; furfural glycerol in alcohol; hydrofuramide in alcohol; and furfural naphthylamine in alcohol.

The mixture of catalyst and solution of a furan derivative is introduced into an autoclave having an agitating device. Hydrogen is admitted until a pressure of substantially 700 to 1200 pounds per square inch is obtained, while the temperature is maintained at approximately 100 to 200° C. for a period of four to eight hours, the mixture being stirred vigorously during the process. Under these conditions, hydrogenation products are obtained such, for example, as 1-tetrahydrofuryl butanol-3 with small quantities of 1-tetrahydrofuryl butanone-3.

In the foregoing example, solvents have been specified because the furan derivatives were solids. Where the furan derivatives are liquids such, for example, as propyl furoate, reduction can be accomplished either with or without solvent.

It is to be understood that I do not desire to be limited to the exact conditions as described in the above illustrative examples.

While I have given examples in which the alkaline agent is associated with the catalyst prior to treating the compound containing the furan ring therewith, I have also given an example wherein the alkaline agent is added to the furfural independently of the catalyst. In the latter case it is not essential that the alkaline agent be dissolved in the compound containing the furan ring because in some instances it will suffice merely to suspend the alkaline agent in the compound, as for instance, suspending magnesium oxide in furfural. It is to be understood, however, that substantially equivalent results may be obtained whether the alkaline agent is associated with the catalyst prior to adding the catalyst to the compound, or if the alkaline agent is added to the compound independently of the catalyst. In both instances the reaction takes place in the presence of an alkaline agent. My invention contemplates both methods of employing the alkaline agent and the claims are to be interpreted accordingly.

Other alkalies such as sodium carbonate can be used as the alkaline constituent of the catalyst. The alkaline substance can be incorporated with the catalyst or suspended or dissolved in the material to be reduced, or both. Other nickel salts such as nickel sulfate can be used for the preparation of the metallic nickel, or again, the nickel hydroxide and magnesium oxide can be prepared separately and mixed and subsequently reduced. Again, the catalyst can be deposited on kieselguhr or other inert material and the quantity of the catalyst can be varied within wide limits.

It will be obvious that furan derivatives other than those mentioned can be reduced by processes similar to those described above.

While I have described my invention in several of its forms, it is understood that I do not desire to be limited to any of the specific details outlined above other than those pointed out in the appended claims.

I claim:

1. A method for the reduction of a compound containing the furan ring which comprises suspending a catalyst containing nickel in such compound in the liquid state, while subjecting the mixture to the action of hydrogen, under superatmospheric conditions of temperature and pressure.

2. A method for the reduction of furfural which comprises suspending a catalyst containing nickel in liquid furfural while subjecting the mixture to the action of hydrogen, under superatmospheric conditions of temperature and pressure.

3. A method for the reduction of a compound containing a furan ring which comprises suspending a catalyst comprising nickel and an alkaline body in such compound in the liquid state, while subjecting the mixture to the action of hydrogen, under superatmospheric conditions of temperature and pressure.

4. A method for the reduction of furfural which comprises suspending a catalyst comprising nickel and an alkaline body in liquid furfural, while subjecting the mixture to the action of hydrogen, under superatmospheric conditions of temperature and pressure.

5. A method for the reduction of a compound containing the furan ring which comprises suspending a catalyst comprising nickel and magnesium oxide in such compound in the liquid state, while subjecting the mixture to the action of hydrogen, under superatmospheric conditions of temperature and pressure.

6. A method for the reduction of furfural which comprises suspending a catalyst comprising nickel and magnesium oxide in liquid furfural, while subjecting the mixture to the action of hydrogen, under superatmospheric conditions of temperature and pressure.

7. The step in the method for the production of tetrahydrofurfuryl alcohol which comprises suspending in liquid furfural a catalyst containing nickel while subjecting the mixture to the action of hydrogen, under superatmospheric conditions of temperature and pressure, and arresting the reaction at the point where substantially only furfuryl alcohol is present.

8. A method for the reduction of furfural which comprises dissolving furfural in a solvent comprising furfural reduction products, and suspending in such liquid a catalyst containing nickel and magnesium oxide while subjecting the mixture to the action of hydrogen, under superatmospheric conditions of temperature and pressure.

9. A method for the reduction of furfural which comprises dissolving furfural in a solvent therefor, and suspending in such liquid a catalyst comprising nickel while subjecting the mixture to the action of hydrogen, under superatmospheric conditions of temperature and pressure.

10. A method for the production of tetrahydrofurfuryl alcohol which comprises dissolving furfural in a solvent comprising tetrahydrofurfuryl alcohol, suspending in such liquid a catalyst containing nickel and magnesium oxide while subjecting the mixture to the action of hydrogen, under superatmospheric conditions of temperature and pressure, and allowing the reaction to proceed until substantially all the furfural has been transformed to tetrahydrofurfuryl alcohol.

11. A method for the reduction of a compound containing the furan ring which comprises dissolving said compound in a solvent therefor, and suspending in such liquid a catalyst comprising nickel while subjecting the mixture to the action of hydrogen, under superatmospheric conditions of temperature and pressure.

12. A method for the reduction of a compound containing the furan ring which comprises subjecting a mixture of said compound with an alkaline agent and a catalyst containing nickel to the action of hydrogen under superatmospheric conditions of temperature and pressure.

13. A method for the reduction of furfural which comprises adding thereto an alkaline agent and suspending therein a catalyst containing nickel, and subjecting the mixture to the action of hydrogen, under superatmospheric conditions of temperature and pressure.

14. A method for the reduction of a compound containing the furan ring which comprises dissolving said compound in a nonreducible solvent therefor, suspending in such liquid a catalyst comprising nickel, and subjecting the mixture to the action of hydrogen under superatmospheric conditions of temperature and pressure.

15. A method for the reduction of a compound containing the furan ring which comprises dissolving said compound in a nonreducible solvent therefor, suspending in such liquid a catalyst comprising nickel and an alkaline agent, and subjecting the mixture to the action of hydrogen under superatmospheric conditions of temperature and pressure.

16. A method for the reduction of a compound containing the furan ring which comprises dissolving said compound in a nonreducible solvent therefor, suspending in such liquid a catalyst comprising nickel, and subjecting the mixture, in the presence of an alkaline agent, to the action of hydrogen under superatmospheric conditions of temperature and pressure.

17. A method for the reduction of furfural which comprises dissolving said furfural in a non-reducible solvent therefor, suspending in such liquid a catalyst comprising nickel, and subjecting the mixture to the action of hydrogen under superatmospheric conditions of temperature and pressure.

18. The method of producing tetrahydrofurfuryl alcohol which comprises heating furfural under pressure in the presence of hydrogen, a nickel catalyst and water.

19. The method of claim 18 in which the heating is carried out at a temperature of above 50° C.

20. The method of producing tetrahydrofurfuryl alcohol which comprises heating furfural at a temperature between 50° and 150° C. under pressure in the presence of hydrogen, a nickel catalyst and water.

21. The method of claim 20 in which the reaction is carried out at pressures of at least 100 pounds per square inch.

22. The liquid phase method of producing tetrahydrofurfuryl alcohol which comprises heating furfural under pressure in the presence of hydrogen, a nickel catalyst and water.

23. The method of claim 20 in which the catalyst comprises magnesium oxide and nickel.

24. The liquid phase method of producing tetrahydrofurfuryl alcohol which comprises heating furfural under pressure in the presence of hydrogen, a base metal catalyst, and water.

25. The liquid phase method of reducing furfural which comprises heating furfural under pressure in the presence of hydrogen and a base metal catalyst.

In witness whereof, I have hereunto subscribed my name.

FREDUS N. PETERS, Jr.